| United States Patent [19] | [11] | 4,141,882 |
|---|---|---|
| Kodama et al. | [45] | Feb. 27, 1979 |

[54] POLYESTER COMPOSITIONS

[75] Inventors: Tsuneo Kodama; Isao Sasaki; Hiroshi Mori, all of Otake, Japan

[73] Assignee: Mitsubishi Rayon Co., Ltd., Tokyo, Japan

[21] Appl. No.: 835,707

[22] Filed: Sep. 22, 1977

[30] Foreign Application Priority Data

Sep. 29, 1976 [JP] Japan .............................. 51-116763

[51] Int. Cl.² ............................................. C08L 63/00
[52] U.S. Cl. .............................. 260/40 R; 260/37 EP; 260/835
[58] Field of Search .................. 260/835, 40 R, 37 EP

[56] References Cited

U.S. PATENT DOCUMENTS

| 2,741,607 | 4/1956 | Bradley | 260/835 |
|---|---|---|---|
| 3,560,605 | 2/1971 | Siggel | 260/835 |
| 3,624,180 | 11/1971 | Schmid | 260/835 |
| 3,849,383 | 11/1974 | Fetscher | 260/835 |
| 3,962,520 | 6/1976 | Watanabe | 260/835 |
| 3,965,212 | 6/1976 | Kamada | 260/835 |
| 4,010,219 | 3/1977 | Aoyama | 260/835 |
| 4,020,122 | 4/1977 | Borman | 260/835 |

FOREIGN PATENT DOCUMENTS

| 2363259 | 1/1975 | Fed. Rep. of Germany | 260/835 |
|---|---|---|---|
| 50-96648 | 12/1975 | Japan. | |
| 954110 | 4/1964 | United Kingdom | 260/835 |

*Primary Examiner*—Paul Lieberman
*Attorney, Agent, or Firm*—Oblon, Fisher, Spivak, McClelland & Maier

[57] ABSTRACT

Disclosed is a polyester composition obtained by blending, with a polyester comprising at least 80% by mole of ethylene terephthalate units, (1) an epoxy compound (A) having an isocyanuric acid ester construction or a cyanuric acid ester construction and at least one organic compound (B) capable of reacting with the epoxy group of said epoxy compound (A) and having one or more carboxyl, amino, isocyanate or hydroxyl groups or (2) a product of a melt reaction of said epoxy compound (A) with said organic compound (B), and then melt mixing and milling the blend. The polyester composition may comprise a fibrous filler and glass flakes, and has a high moldability and excellent physical properties.

12 Claims, No Drawings

POLYESTER COMPOSITIONS

BACKGROUND OF THE INVENTION

1. Field of the Invention

This invention relates to ethylene terephthalate polyester compositions which exhibit excellent moldability and physical properties. Particularly, the invention relates to ethylene terephthalate polyester compositions having high melt viscosity and excellent moldability, and further relates to reinforced ethylene terephthalate polyester compositions having excellent moldability, heat resistance, mechanical properties and appearance in the shaped articles obtained therefrom.

2. Description of the Prior Art

Polyethylene terephthalate has not been so broadly utilized in the field of molding, notwithstanding the excellent physical and mechanical properties thereof. The reason for this is mainly due to the inferior moldability of polyethylene terephthalate. Particularly, where polyethylene terephthalate of a comparatively low molecular weight is employed, it is difficult to successfully carry out molding by utilizing a usual molding machine because of the extremely low melt viscosity of the polyethylene terephthalate. For overcoming this drawback, attempts have been made to obtain polyethylene terephthalate with a high molecular weight. However, such attempts have not yet produced satisfactory results because of the inconvenient and expensive operation required to carry out the condensation-polymerization process.

Polyethylene terephthalate has a further drawback in that the shaped articles produced by using the conventional molding methods, have inferior physical properties. This is because the low rate of crystallization in the polyethylene terephthalate produces a low degree of crystallinity in the shaped articles. In order to eliminate this drawback, methods have been proposed for producing reinforced polyethylene terephthalate by adding an inorganic filler such as glass fiber to improve the rigidity of the product, or by adding a nucleator or molding through a die at a high temperature to heighten the crystallinity. However, the heat resistance of the reinforced polyethylene terephthalate obtained by using these methods is highly dependent on the crystallinity of the products, i.e. on the die temperature during the molding. Due to this factor, the resultant shaped articles are often inferior in appearance. Accordingly, these methods are not satisfactory from an economical standpoint with regard to the quality of the resultant products.

SUMMARY OF THE INVENTION

It is the primary object of the present invention to provide, in a simple and economical manner, an ethylene terephthalate polyester composition which exhibits excellent moldability and physical properties and which provides molded articles with an excellent appearance.

The present invention provides a polyester composition obtained by blending, with polyester comprising at least 80% by mole of ethylene terephthalate units, (1) an epoxy compound (A) having an isocyanuric acid ester construction or a cyanuric acid ester construction, in an amount of from 0.0005 to 0.02 moles per 100 g of the subject polyester, and at least one organic compound (B) capable of reacting with the epoxy group of said epoxy compound (A), selected from those having one or more carboxyl, amino, isocyanate or hydroxyl groups, in an amount of from 0.2 to 2.0 moles per mole of the above-mentioned epoxy compound (A), or (2) a product of a melt reaction of the epoxy compound (A) with the organic compound (B) at a (B)/(A) mole ratio of from 0.5 to 2.0 at a temperature of from 100° to 200° C. for a period of from 5 to 30 minutes, in such an amount that the epoxy compound (A) prior to the melt reaction is in an amount of from 0.0005 to 0.02 moles per 100 g of the polyester, and then melt mixing and milling the blend.

DETAILED DESCRIPTION OF THE INVENTION

The epoxy compounds having an isocyanuric acid ester construction or a cyanuric acid ester construction, usable for the present invention, have a specifically remarkable effect to increase the melt viscosity of polyethylene terephthalate, as compared with other epoxy or functional compounds. However, when the above-mentioned epoxy compounds are used alone, the polyethylene terephthalate becomes undesirably infusible during melt mixing and milling due to the high reactivity of the epoxy compounds for decreasing the flowability of the polymer and the polyethylene terephthalate becomes colored during molding into shaped articles. It has been found that the use of the epoxy compounds in combination with the organic compounds having one or more functional groups such as carboxyl, amino, isocyanate or hydroxyl groups can stably produce a polyethylene terephthalate composition with a high melt viscosity without causing the above-mentioned problems.

Polyester suitable for the present invention comprises at least 80% by mole of ethylene terephthalate units and less than 20% by mole of other ester units derived from a hydroxy compound such as ethylene glycol, trimethylene glycol, 1,4-cyclohexanedimethanol, glycerin or pentaerythritol and an acid such as terephthalic acid, isophthalic acid, 1,4-or 1,5-naphthalic acid, adipic acid or sebacic acid. The polyester is herein referred to as ethylene terephthalate polyester. The polyester compositions of the present invention may further comprise a color protection agent, a heat-resistant agent, a flame-retardant agent and the like.

The epoxy compounds usable for the present invention have an isocyanuric acid ester construction or a cyanuric acid ester construction. Typical examples of the epoxy compounds are triglycidyl isocyanurate of the formula,

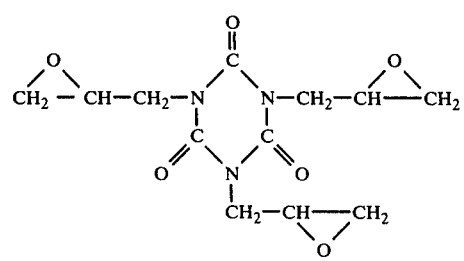

N-methyl-N', N''-diglycidyl isocyanurate of the formula,

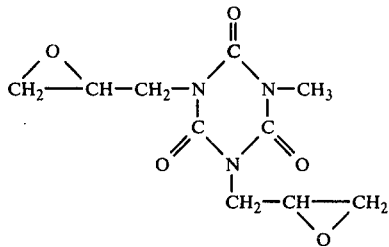

and triglycidyl cyanurate of the formula,

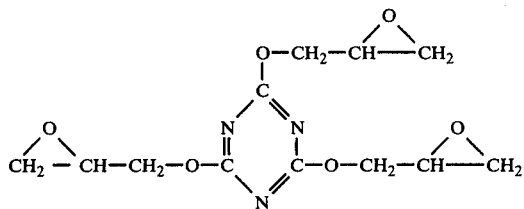

The epoxy compounds are preferably added in an amount of from 0.0005 to 0.02 moles per 100 g of ethylene terephthalate polyester. If the amount of epoxy compounds is less than 0.0005 mole, no heightening effect on the melt viscosity is attained. If the amount is more than 0.02 mole, the resulting polyester composition becomes unsuitably infusible.

The functional organic compounds usable for the present invention have one or more functional carboxyl, amino, isocyanate or hydroxyl groups. As such carboxyl group-containing organic compounds, there are, for example, aliphatic carboxylic acids such as acrylic acid, methacrylic acid, maleic acid, itaconic acid and the anhydrides thereof; and aromatic carboxylic acids such as trimellitic acid, phthalic acid, terephthalic acid, benzoic acid, methylbenzoic acid, dimethylbenzoic acid and the anhydrides thereof. As amino group-containing organic compounds, there are, for example, ethylenediamine, tetramethylenediamine, hexamethylenediamine, diphenylamine and γ-aminopropyl-trimethoxysilane; as isocyanate group-containing organic compounds, there are, for example, hexamethylene diisocyanate, 4, 4'-diphenylmethane diisocyanate, 2,6-tolylene diisocyanate and m-phenylene diisocyanate; and as hydroxyl group-containing organic compounds, there are, for example, glycerol, ethylene glycol, propylene glycol, sorbitol, resorcinol and 2-hydroxyethyl acrylate. These functional organic compounds are desirably added in an amount of from 0.2 to 2.0 moles per mole of epoxy compound. If the amount is less than 0.2 mole, the resulting composition often has a non-uniform melt viscosity. If the amount is more than 2.0 moles the heightening effect on the melt viscosity is reduced.

The epoxy compounds and the functional organic compounds are usually in powder form and may thus be added directly to the ethylene terephthalate polyester. However, it is preferable to first melt react them and then to add the melt reaction product to the ethylene terephthalate polyester, because a more uniform melt viscosity can be attained, and also because the resulting composition can produce shaped products, such as film and sheet, with an excellent appearance having little or no fisheyes. In such a case, it is particularly preferable to employ, as the functional organic compounds, an aromatic carboxylic acid such as benzoic acid, methylbenzoic acid, dimethylbenzoic acid or phthalic acid or an acid anhydride such as benzoic anhydride or phthalic anhydride, especially benzoic acid. The melt reaction may be carried out by introducing predetermined amounts of an epoxy compound and of a functional organic compound into a container having a cooling cylinder, and stirring in the molten state at a temperature of from 100° to 200° C. for a duration of from 5 to 30 minutes. When the reaction temperature is lower than 100° C., the reaction becomes non-uniform. When the reaction temperature is higher than 200° C., coloring appears on the reaction product because bonding occurs between the epoxy groups or because by-products are produced. If the reaction time is less than 5 minutes, the reaction cannot take place sufficiently. If the reaction time is more than 30 minutes, this reaction is not able to proceed any further and the reaction product often is undesirably colored. In the case where the melt reaction is to be carried out at a relatively high temperature for a relatively long time, it is advantageous to carry out the reaction under an inert gas atmosphere such as nitrogen in order to prevent coloring from appearing on the product. In the melt reaction, the epoxy compound (A) and the functional organic compound (B) are desirably employed at a mole ratio of compound (B) to compound (A) of from 0.5 to 2.0. If the mole ratio is less than 0.5, the resulting polyester composition will have a non-uniform melt viscosity and will become infusible. If the mole ratio is greater than 2.0, the heightening effect on the melt viscosity will be reduced. The obtained reaction product, modifier (C), is preferably added to the ethylene terephthalate polyester in such an amount that the epoxy compound (A) prior to the melt reaction is in an amount of from 0.0005 to 0.02 mole per 100 g of the polyester. If the amount is less than 0.0005 mole the resulting composition will have an insufficiently low melt viscosity. If the amount is greater than 0.02 mole, the resulting composition will become infusible or colored. It is preferable to add the modifier (C) to the polyester immediately after completion of the melt reaction prior to the cooling and solidification of the modifier. During addition and blending of the solidified modifier, non-uniform distribution of the modifier is produced in the resultant composition which causes the compositions melt viscosity to become non-uniform. In such a case, fisheyes are easily produced on the shaped articles obtained from the resultant composition. When the modifier (C) is ready to be cooled into a solid or viscous state, it is preferable to add an inert diluting solvent. The preferred diluents are, for example, chloroform, dichloroethane, tetrachloroethane, dioxane, epichlorohydrin, acetone, methanol and ethanol. These diluents may be added prior to or after the melt reaction of the compounds (A) and (B). It is preferable to add a particular amount of diluents so that the diluents constitute from about 0.2 to 1.5% by weight of ethylene terephthalate polyester.

According to an embodiment of the present invention, predetermined amounts of an epoxy compound and of a functional organic compound or a modifier obtained from the melt reaction of the compounds are added to ethylene terethalate polyester; then, they are uniformly blended in a Henschel mixer or tumbler. Thereafter, the blend is melt mixed and milled on a usual mixing apparatus such as a Banbury mixer, Farrel mixer or, preferably, an extruder. A suitable temperature for the melt mixing and milling is from 265° to 300° C. and a suitable duration for the melt mixing and milling is from 2 to 10 minutes. However, in injection molding, blow molding, sheet extrusion or the like, the blend may be directly subjected to molding without being subjected to the melt mixing and milling.

The polyester composition of the present invention may be reinforced by incorporation therein a fibrous filler. For example, it is known from Japanese Patent Publication No. 48-6175 that the incorporation of an epoxy resin of the bisphenol or polyol ether type in a reinforced polyethylene terephthalate comprising glass fibers can generally improve the physical properties of the reinforced polyethylene terephthalate. However, the improvement obtained by utilizing such an epoxy resin is not necessarily satisfactory. It has now been found that the incorporation of a fibrous filler in an ethylene terephthalate polyester composition according to the present invention, obtained by using an epoxy compound having an isocyanuric acid ester or cyanuric acid ester construction and an aromatic carboxylic acid or an anhydride thereof can produce a reinforced polyester composition of specific remarkably improved mechanical properties.

The epoxy compound and the aromatic compound as well as the fibrous filler may be directly added to the ethylene terephthalate polyester. However, the addition of the epoxy compound and the aromatic compound in the state of a melt reaction product produces more preferable results. That is, the product of the melt reaction of the epoxy compound and the aromatic compound is obtained in a viscous liquid form. Thus, the addition of the melt reaction product, the modifier, to ethylene terephthalate polyester makes it possible for the fibrous filler to be uniformly distributed throughout the polyester due to the viscosity of the modifier. The fibrous filler may preferably be incorporated after a preliminary melt mixing and milling of the polyester and the modifier. In such a case, a polyester composition with higher physical properties can be obtained, as compared with the case where the fibrous filler is added simultaneously together with the modifier.

The fibrous fillers usable for the present invention include glass fibers, asbestos fibers, titanate fibers and carbon fibers. These fillers may be suitably added in an amount of from 10 to 50% by weight based on the total weight of the composition. If the amount of the fillers is too low, the physical properties of the resulting composition will be unsatisfactory. On the other hand if the amount of the fillers is too high, the moldability of the composition is lowered.

It has further been found that if glass flakes are further incorporated into the above-mentioned reinforced polyester composition according to the invention, the dependence of heat resistance of the composition on the die temperature during the molding will be remarkably improved. The incorporation of the glass flakes into the composition can advantageously improve not only the crystallinity but also the mechanical strength of the composition. The reinforced polyester composition containing the glass flakes has further advantages in that the composition can produce white, opaque, homogeneous shaped articles having lustrous and smooth surfaces even when the articles are being molded at a low die temperature. The glass flakes usable for the present invention are scale-like flakes each of a size not larger than 32 mesh and of a thickness of from 0.5 to 10μ. The smaller the size of the flakes, the better the quality of the resulting products. Preferably, such glass flakes are added in an amount of from 1 to 40% by weight based on the total weight of the composition. If the amount of glass flakes added into the composition is less than 1%, the effect is too low. If the amount of glass flakes is more than 40%, the physical properties of the resulting composition will become poor.

The invention is further illustrated below by way of examples, wherein all parts are by weight and the inherent viscosity of the polyethylene terephthalate is shown by a value determined in a phenol/tetrachloroethane (50:50) mixture at a temperature of 25° C. The added amounts of the epoxy compounds are shown by moles per 100 g of polyethylene terephthalate, and the added amounts of the functional organic compounds are shown by moles per mole of the used epoxy compound. The melt indices were determined according to the ASTM D-1238 method under a load of 2.8 kg at a temperature of 265° C. using pellets dried at 160° C. for 24 hours.

Furthermore, the tensile strength was determined according to the ASTM D-638 method using type I dumbbell specimens each 3.2 mm thick, and the flexural strength was determined according to ASTM D-790 using heat distortion specimens each 3.2 mm thick.

EXAMPLE 1, COMPARATIVE EXAMPLE 1

Polyethylene terephthalate (PET) of an inherent viscosity of 0.72 obtained by the condensation of terephthalic acid and ethylene glycol was blended with prescribed amounts of triglycidyl isocyanurate (TGIC) and acrylic acid (Aa) in a tumbler for 3 minutes. The blend was melt mixed and milled in a nonvented extruder of a diameter of 30 mm (L/D=25) at 275° C. with a mean residence time of 5 minutes. The obtained pellets were again subjected to extrusion under the same condition and the melt index (MI) of each of the pellets obtained by the first and second extrusions was determined. The results are shown in Table 1 below.

For comparison, melt indices of pellets obtained as mentioned above but in this case, obtained by using TGIC and Aa in amounts outside the scope of the present invention are also given in Table 1.

When only TGIC is used, if the added amount is less than 0.0005 mole no heightening effect of the melt viscosity is obtained; while if the added amount is greater than 0.0005 mole the MI of the product is not uniform or the product becomes infusible.

When both TGIC and Aa are used, if TGIC is added in an amount less than 0.0005 mole or Aa is added in an amount greater than 2 moles, no heightening effect of the melt viscosity is obtained; while if TGIC is added in an amount greater than 0.02 mole, or Aa is added in an amount less than 0.2 mole the MI of the product is not uniform or the product becomes infusible.

If the added amount of TGIC is in a range between 0.0005 and 0.02 mole and that of Aa is in a range between 0.2 and 2.0 moles, the MI of the product is uniform and the product does not become infusible even after the second extrusion. In either the first extrusion or the second extrusion, the melt viscosity of the extruded strand remained high and stable during the continuous processing which occurred over a long period of time.

Table 1

| | TGIC (mole) | Aa/TGIC (mole ratio) | MI(g/10 min.) After First Extrusion | Second Extrusion |
|---|---|---|---|---|
| Comparative Example 1 | 0 | 0 | 126 | 289 |
| | 0.0003 | 0 | 124 | 278 |
| | 0.0005 | 0 | 52 – 113 | becomes infusible |
| | 0.0025 | 0 | 15 – 38 | becomes infusible |
| | 0.0200 | 0 | becomes infusible | — |
| | 0.0003 | 0.1 | 148 | 328 |
| | 0.0300 | 0.01 | becomes infusible | — |
| | 0.0250 | 0.05 | 20– 33 | becomes infusible |
| | 0.0250 | 2.30 | 164 | 342 |
| Example 1 | 0.0005 | 0.2 | 59 | 103 |
| | 0.0025 | 1.0 | 27 | 47 |
| | 0.0050 | 1.2 | 18 | 31 |
| | 0.0150 | 1.5 | 15 | 24 |
| | 0.0200 | 2.0 | 10 | 16 |

EXAMPLE 2

The procedure used in Example 1 was repeated using triglycidyl cyanurate (TGC) or N-methyl-N',N''-diglycidyl isocyanurate (MGIC) instead of TGIC of Example 1. Accordingly, PET compositions similar to those in Example 1 were obtained. The results are shown in Table 2.

From the table, it is apparent that these epoxy compounds also exhibit a heightening effect similar to that of the melt viscosity for PET.

Table 2

| Epoxy Compound | (mole) | Aa/Epoxy Compound (mole ratio) | MI(g/10 min.) After First Extrusion | Second Extrusion |
|---|---|---|---|---|
| TGC | 0.0017 | 1.0 | 25 | 43 |
| | 0.0025 | 1.0 | 19 | 32 |
| | 0.0080 | 1.0 | 12 | 20 |
| MGIC | 0.0017 | 1.0 | 22 | 39 |
| | 0.0025 | 1.0 | 16 | 26 |
| | 0.0080 | 1.0 | 11 | 18 |

EXAMPLE 3

The procedure used in Example 1 was repeated using various functional organic compounds instead of Aa of Example 1. Thus, PET compositions similar to those in Example 1 were obtained. The results are shown in Table 3 below.

TABLE 3

| TGIC (mole) | Functional Organic Compound | (mole ratio to TGIC) | MI (g/10 min.) After First Extrusion | Second Extrusion |
|---|---|---|---|---|
| 0.0025 | maleic anhydride | 1.0 | 24 | 46 |
| 0.0025 | benzoic acid | 1.0 | 26 | 44 |
| 0.0025 | tetramethylenediamine | 1.0 | 31 | 53 |
| 0.0025 | γ-aminopropyl-trimethoxysilane | 1.0 | 26 | 46 |
| 0.0025 | hexamethylene diisocyanate | 1.0 | 19 | 34 |
| 0.0025 | m-phenylene diisocyanate | 1.0 | 18 | 29 |
| 0.0025 | glycerol | 1.0 | 29 | 53 |
| 0.0025 | ethylene glycol | 1.0 | 27 | 48 |

EXAMPLE 4

A. Preparation of Modifier

Into a four-neck separable flask of 500 cc provided with a stirring rod, cooling cylinder, nitrogen-introducing tube and dropping funnel, 85 g of triglycidyl isocyanurate (TGIC) and 34 g of benzoic acid (BA) (mole ratio 1:1) were introduced and nitrogen was thereafter introduced for 1 minute. The flask was placed in an oil bath of 120° C. and TGIC and BA were reacted under a nitrogen atmosphere while being stirred for 15 minutes after melting. Upon completion of the reaction, 109 g of tetrachloroethane (TCE) were dropped into the flask from the dropping funnel; the mixture was then stirred for 2 minutes. Thus, a colorless and transparent modifier solution was obtained.

B. Extrusion of Modified Polyethylene Terephthalate

Immediately after pre-drying at 80° C., 5 kg of polyethylene terephthalate (PET) of an inherent viscosity of 0.72 obtained by the condensation of terephthalic acid and ethylene glycol were blended together with 67 g of the above described modifier solution in a tumbler for 5 minutes. In the blend, TGIC was in an amount of 0.0017 moles per 100 g of PET; the mole ratio of BA to TGIC was 1; and TCE was in an amount of 0.64% by weight based on the weight of PET.

Then, the blend was supplied to a hopper of a vented extruder of a diameter of 30 mm (L/D = 25); sealed therein with nitrogen; melt mixed and milled under a polymer temperature of 275° C. for a mean residence time of 5 minutes; and extruded from a T-die of 1 mm in thickness, while taking off at a rate of 4 m/sec., to obtain a 0.3 mm thick sheet. No drawdown effect was observed in the polymer being extruded, and the obtained sheet was transparent and uniform and exhibited no fisheyes. The sheet was chopped and a MI of 32 g/10 min. was determined.

Comparative Example 2

TGIC powder was blended with PET as in Example 4 in an amount of 0.0017 moles per 100 g of PET, and the blend was extruded as in Example 1. The melt viscosity of the polymer composition being extruded was varied so as to be gradually heightened. Because the polymer composition became finally infusible, extrusion could not be successfully carried out.

EXAMPLE 5

The procedure used in Example 4 was repeated except that the preparation of modifier solutions was effected under the conditions as shown in Table 4 below. The quality of the obtained sheets is also shown in the Table 4.

It was observed that with an increase in the added amount of BA and in the temperature, the MI of the polymer composition was heightened. However, in general, the polymer compositions had a good sheet-formability and a stable melt viscosity, and the obtained sheets were transparent and uniform without exhibiting any fisheyes.

TABLE 4

| BA/TGIC* (mole ratio) | Reaction Temperature (°C.) | Reaction Time (min.) | MI (g/10 min.) | Fisheyes |
| --- | --- | --- | --- | --- |
| 0.5 | 120 | 15 | 22 | scarcely appeared |
| 1.0 | 100 | 15 | 27 | none |
| 1.0 | 120 | 5 | 26 | none |
| 1.0 | 120 | 20 | 34 | none |
| 1.0 | 120 | 30 | 34 | none |
| 1.0 | 150 | 15 | 36 | none |
| 1.0 | 200 | 15 | 41 | none |
| 1.5 | 120 | 15 | 38 | none |
| 2.0 | 120 | 15 | 43 | none |

*The added amount of TGIC (on the basis of the amount prior to the melt reaction) was 0.0017 moles per 100 g of PET.

Comparative Example 3

The procedure used in Example 4 was repeated except that modifier solutions prepared under the conditions shown in Table 5 were used. The quality of the obtained products is also shown in Table 5.

It is apparent, from a comparison of the results in Table 5 with those in Table 4, that if the BA/TGIC mole ratio is less than 0.5, the polymer composition becomes infusible; and if the BA/TGIC mole ratio is greater than 2, the polymer composition has a low melt viscosity and produces a drawdown effect. If the temperature is lower than 100° C., the MI of the polymer composition is unstable and fisheyes will appear on the obtained sheet. If the temperature is higher than 200° C., coloring occurs on the sheet. If the reaction time is more than 30 minutes, undesirable coloring will occur on the sheet. Thus, it is preferred that the modifier solutions are prepared wherein the BA/TGIC mole ratio is from 0.5 to 2.0, the reaction temperature is from 100° to 200° C., and the reaction time is from 5 to 30 minutes.

TABLE 5

| BA/TGIC (mole ratio) | Reaction Temperature (°C.) | Reaction Time (min.) | Melt Viscosity of Extruded Composition | MI (g/10 min.) | Fisheyes | Color |
| --- | --- | --- | --- | --- | --- | --- |
| 0.3 | 120 | 15 | becomes infusible | — | — | — |
| 2.5 | 120 | 15 | drawdown occurs | 72 | none | colorless |
| 1.0 | 80 | 15 | unstable | 22 - 35 | numerous | colorless |
| 1.0 | 220 | 15 | stable | 39 | none | yellow |
| 1.0 | 120 | 35 | stable | 34 | none | light yellow |

EXAMPLE 6

The modifier solution obtained by using the procedure of Example 4 was blended with PET in such an amount that the amount of TGIC prior to the melt reaction was 0.0005, 0.005 or 0.02 moles per 100 g of PET. Using these blends, the procedure used in Example 4 was repeated. The melt viscosity of each extruded polymer composition was stable, and transparent and uniform sheets were obtained. The quality of the products is shown in Table 6.

Comparative Example 4

The procedure used in Example 6 was repeated except that the modifier solution was blended with PET in such an amount that the amount of TGIC prior to the melt reaction was 0.0003 or 0.025 mole per 100 g of PET. The results of Comparative Example 4 are also shown in Table 6.

TABLE 6

| | TGIC* (mole) | MI (g/10 min.) | Fisheyes |
| --- | --- | --- | --- |
| Example 6 | 0.0005 | 46 | none |
| | 0.005 | 24 | none |
| | 0.02 | 18 | scarcely appeared |
| Comparative Example 4 | 0.0003 | 97 | none |
| | 0.025 | 13 | numerous |

*BA/TGIC mole ratio was 1.

EXAMPLE 7

Using triglycidyl cyanurate and N-methyl-N',N''-diglycidyl isocyanurate instead of TGIC, the procedure used in Example 4 was repeated. Each of the extruded polymer compositions was highly viscous and stable, and the obtained sheets were transparent and uniform in appearance without exhibiting any fisheyes. The MI determined for the chopped sheets were 28 g/10 min. and 26 g/10 min., respectively.

EXAMPLE 8

The procedure used in Example 4 was repeated using benzoic anhydride and phthalic anhydride instead of BA. Each of the extruded polymer compositions was highly viscous and stable and the obtained sheets were transparent and uniform in appearance without exhibiting any fisheyes. The MI determined for the chopped sheets were 33 g/10 min. and 37 g/10 min., respectively.

Example 9, Comparative Example 5

A mixture of 70 parts of polyethylene terephthalate of an inherent viscosity of 0.72 and 30 parts of chopped glass strands of a length of 3 mm was blended with each of the epoxy compounds and aromatic carboxylic acids in a tumbler as shown in Table 7. The blend was formed into pellets on a nonvented extruder of a diameter of 30 mm (L/D = 25) at 280° C. The pellets were then formed, on a screw-in-line type of injection molding machine of 36 mm and 5 oz. at a cylinder temperature of 280° C. and at a die temperature of 80° C., into type I dumbbell specimens each 3.2 mm thick and into heat distortion specimens each 3.2 mm thick to determine the properties of the obtained polymer composition. The results are shown in Table 7.

The polymer compositions containing an epoxy compound having an isocyanurate ring such as triglycidyl isocyanurate (TGIC) or N-methyl-N',N"-diglycidyl isocyanurate (MGIC) had notably high strength properties. However, because the short shot pressures of these compositions were high, these compositions exhibited disadvantages such as decreases in flowability and occurrences of coloring in the shaped articles. On the other hand, because the polymer compositions obtained using TGIC or MGIC in combination with an aromatic carboxylic acid or an anhydride thereof exhibited high strength properties and excellent flowability, colorless shaped articles could thus be produced.

Example 10, Comparative Example 6

The procedure used in Example 9 was repeated using different amounts of TGIC and benzoic acid (BA). The results are shown in Table 8.

It is suitable that TGIC is added in an amount of from 0.05 to 3% by weight (0.035 to 2.1 parts), that BA is added in an amount of from 0.01 to 2.5% by weight (0.007 to 1.75 parts), and that the BA/TGIC mole ratio is in a range of from 0.5 to 2. If TGIC is more than 3% by weight, the shaped articles are colored. If the amount of BA is too small, the polymer composition becomes inferior in flowability and coloring occurs in Table 7

|  | Epoxy compounds** (part) |  | Aromatic carboxylic acid (part) |  | Tensile strength (kg/cm$^2$) | Flexural strength (kg/cm$^2$) | Short shot pressure (kg/cm$^2$) | Coloring on* shaped article |
|---|---|---|---|---|---|---|---|---|
| Comparative example 5 | — | 0 | — | 0 | 1350 | 1900 | 19 | ◉ |
|  | 1 | 0.35 | — | 0 | 1480 | 2050 | 21 | ○ |
|  | 2 | 0.35 | — | 0 | 1450 | 2000 | 20 | ○ |
|  | 3 | 0.35 | — | 0 | 1400 | 1970 | 17 | Δ |
|  | 4 | 0.35 | — | 0 | 1240 | 1860 | 18 | ○ |
|  | 5 | 0.35 | — | 0 | 1220 | 1780 | 15 | ○ |
|  | 6 | 0.35 | — | 0 | 1340 | 1910 | 20 | Δ |
|  | 7 | 0.35 | — | 0 | 1400 | 2000 | 24 | Δ |
|  | TGIC | 0.35 | — | 0 | 1570 | 2280 | 29 | × |
|  | MGIC | 0.35 | — | 0 | 1530 | 2270 | 27 | × |
| Example 9 | TGIC | 0.35 | benzoic acid | 0.14 | 1620 | 2350 | 15 | ◉ |
|  | TGIC | 0.35 | benzoic anhydride | 0.14 | 1610 | 2360 | 17 | ◉ |
|  | TGIC | 0.35 | phthalic anhydride | 0.14 | 1630 | 2350 | 16 | ◉ |
|  | MGIC | 0.35 | benzoic acid | 0.14 | 1610 | 2300 | 16 |  |

*◉: not colored, ○ scarcely colored, Δ fairly colored, × notably colored.
** The constructions of the epoxy compounds 1 through 7 are as follows.

1–3:

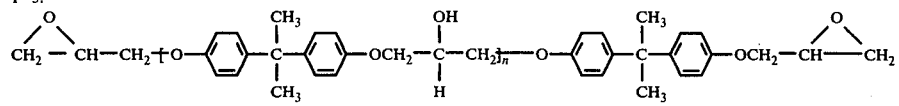

1; n=0, 2; n=2, 3; n=3.7

4, 5:

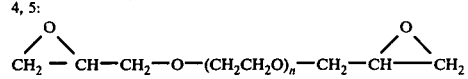

4; n=1, 5; n=13

6:

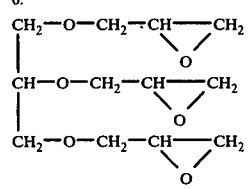

7:

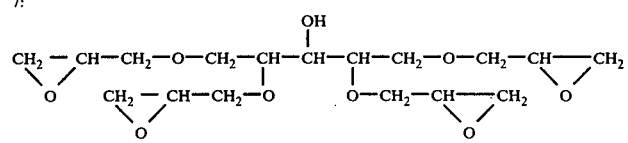

the shaped articles. However, if the amount of BA is too large, the strength of the products becomes inferior.

Table 8

|  | TGIC (part) | BA (part) | BA/TGIC (mole ratio) | Tensile strength (kg/cm$^2$) | Flexural strength (kg/cm$^2$) | Short shot pressure (kg/cm$^2$) | Coloring on shaped article |
|---|---|---|---|---|---|---|---|
| Example 10 | 0.035 | 0.007 | 0.5 | 1600 | 2340 | 16 | ○ |
|  | 0.35 | 0.07 | 0.5 | 1660 | 2380 | 16 | ○ |
|  | 0.35 | 0.28 | 2.0 | 1610 | 2310 | 15 | ○ |
|  | 2.1 | 1.75 | 2.0 | 1680 | 2400 | 17 | ○ |
| Comparative example 6 | 0.35 | 0.035 | 0.25 | 1590 | 2300 | 26 | × |
|  | 0.35 | 0.42 | 3.0 | 1480 | 1950 | 15 | ○ |
|  | 4 | 3.3 | 2.0 | 1660 | 2380 | 18 | × |

EXAMPLE 11

Fourteen parts of the melt reaction product of TGIC and BA as in Example 4 were dissolved in 30 parts of acetone. The obtained modifier solution was blended with 2000 parts of PET of an inherent viscosity of 0.72 in a tumbler. The blend was then dried in a steam dryer at 80° C. for 1 hour to remove acetone therefrom. Thus, the modifier was uniformly adhered onto the surfaces of the PET chips so that the chip surfaces were somewhat viscous. The dried blend was then blended with 857 parts of chopped glass strands, each having a length of 3 mm, in a tumbler to obtain a PET/glass fiber blend wherein the glass fibers were uniformly adhered onto the PET chip surfaces. Thereafter, the PET/glass fiber blend was subjected to extrusion by a nonvented extruder of a diameter of 30 mm (L/D=25) at 380° C. and then subjected to injection molding in the manner as described in Example 9. The properties of the obtained shaped articles were determined by using procedures described in Example 9.

The tensile strength was 1750 kg/cm$^2$ and the flexural strength was 2450 kg/cm$^2$. These strength properties were proved to be superior to those exhibited by the direct blend of TGIC and BA with PET. The short shot pressure during the injection molding was determined to be 16 kg/cm$^2$, which pressure value denotes a good flowability of the composition. The shaped articles were not colored and had lustrous smooth surfaces.

EXAMPLE 12

In the procedure described in Example 13, a blend of the modifier solution and the PET chips was first subjected to extrusion to obtain pellets; then, the pellets (1050 parts) were blended with 450 parts of chopped glass strands each of a length of 3 mm. The PET/glass fiber blend was then subjected to extrusion and injection molding to determine the properties of the shaped articles.

The tensile strength was 1810 kg/cm$^2$ and the flexural strength was 2480 kg/cm$^2$. The composition had a short shot pressure of 19 kg/cm$^2$ and thus good moldability. The shaped articles were not colored and had lustrous surfaces.

EXAMPLE 13, Comparative Example 7

70 parts of PET of an inherent viscosity of 0.72 were blended with 0.5 parts of TGIC and 0.2 parts of BA. To this blend chopped glass strands each of a length of 3 mm and a nucleator as shown in Table 9 were then blended in amounts shown in Table 9. The blend was subjected to extrusion by a nonvented extruder of a diameter of 30 mm (L/D=25) at 280° C. to obtain pellets, and then subjected to injection molding by a screw-in-line type of injection molding machine of 36 mm and 5 oz at a cylinder temperature of 280° C. and at a die temperature as shown in Table 9. Then, the properties of the shaped articles were determined as described in Example 9. However, the heat distortion temperature was determined according to ASTM D790 using 6.4 mm-thick specimens. The results are shown in Table 9.

In the case where the die temperature is 80° C., the compositions containing calcium benzoate and magnesium stearate have a heat distortion temperature above 200° C.; whereas the compositions containing the other nucleators except for glass flakes have a low heat distortion temperature of from 85° to 108° C. Where calcium benzoate or magnesium stearate is used, the physical properties of the resultant product will be highly dependent on the die temperature. Furthermore, the luster of the surfaces of the products is generally inferior where the nucleators other than the glass flakes are employed.

Shaped articles obtained from a composition consisting of 70 parts of PET and 30 parts of chopped glass strands had very low physical properties, i.e. a tensile strength of 1350 kg/cm$^2$ and a heat distortion temperature of 84° C.

Table 9

| | Nucleator | | Glass fiber (part) | Die temperature (°C.) | Tensile strength (kg/cm$^2$) | Heat distortion temperature (°C.) | Luster** |
|---|---|---|---|---|---|---|---|
| | | Size (mesh) | Amount (part) | | | | | |
| Comparative example 7 | — | — | 0 | 30 | 80 | 1620 | 87 | Δ |
| | — | — | 0 | 30 | 150 | 1740 | 230 | ○ |
| | MgO | — | 0.5 | 30 | 80 | 1580 | 89 | × |
| | ZnO | — | 0.5 | 30 | 80 | 1610 | 88 | Δ |
| | BaSO$_4$ | — | 0.5 | 30 | 80 | 1560 | 96 | Δ |
| | calcium benzoate | — | 0.5 | 30 | 80 | 1600 | 214 | Δ |
| | calcium benzoate | — | 0.5 | 30 | 150 | 1640 | 233 | ○ |
| | magnesium stearate | — | 0.5 | 30 | 80 | 1590 | 209 | Δ |
| | magnesium stearate | — | 0.5 | 30 | 150 | 1630 | 224 | ○ |
| | CaCO$_3$ | — | 5 | 25 | 80 | 1140 | 108 | × |
| | Al$_2$O$_3$ | — | 5 | 25 | 80 | 1100 | 107 | Δ |
| | glass powder | ≦ 32 | 5 | 25 | 80 | 1280 | 85 | Δ |
| | glass powder | ≦ 100 | 5 | 25 | 80 | 1290 | 88 | Δ |
| | glass flake * | ≦ 200 | 0.5 | 29.5 | 80 | 1660 | 135 | ○ |
| Example 13 | glass flake * | ≦ 32 | 5 | 25 | 80 | 1640 | 224 | ◉ |
| | glass flake * | ≦ 100 | 5 | 25 | 80 | 1670 | 228 | ◉ |
| | glass flake * | ≦ 200 | 5 | 25 | 80 | 1680 | 230 | ◉ |
| | glass flake * | ≦ 200 | 1 | 29 | 80 | 1700 | 225 | ○ |
| | glass flake * | ≦ 200 | 5 | 25 | 150 | 1710 | 235 | ◉ |
| | glass flake * | ≦ 200 | 10 | 20 | 80 | 1690 | 234 | ◉ |
| | glass flake * | ≦ 200 | 15 | 15 | 80 | 1580 | 231 | ◉ |

*Glass flakes each had a thickness of 3 μ.
**◉: excellent, ○ good, Δ slightly poor, × poor.

EXAMPLE 14

The procedure as used in Example 11 was repeated except that a blend of 712 parts of chopped glass strands each of a length of 3 mm and 145 parts of glass flakes each of a particle size not larger than 200 mesh and of a thickness of 3μ was used instead of 857 parts of the chopped glass strands of Example 11.

The obtained shaped articles had a high tensile strength of 1780 kg/cm$^2$ and a high heat distortion temperature of 236° C. The short shot pressure was 14 kg/cm$^2$, which pressure value denotes a good flowability of the composition. The shaped articles were not colored and had lustrous surfaces.

EXAMPLE 15

The procedure as used in Example 12 was repeated except that a blend of 375 parts of chopped glass strands each of a length of 3 mm and 75 parts of glass flakes each of a particle size not larger than 200 mesh and of a thickness of $3\mu$ was used instead of 450 parts of the chopped glass strands used in Example 15.

The obtained shaped articles were not colored, had lustrous surfaces and had a high tensile strength of 1820 kg/cm$^2$ and a high heat distortion temperature of 235° C. The short shot pressure was 18 kg/cm$^2$, which pressure value denotes a good flowability of the composition.

What is claimed is:

1. A polyester composition obtained by blending, with polyester comprising at least 80% by mole of ethylene terephthalate units, (1) an epoxy compound (A) selected from the group consisting of triglycidyl isocyanurate, N-methyl-N',N''-diglycidyl isocyanurate and triglycidyl cyanurate, in an amount of from 0.0005 to 0.02 mole per 100 g of said polyester, and at least one organic compound (B) capable of reacting with the epoxy group of said epoxy compound (A), selected from those having one or more carboxyl, amino, isocyanate or hydroxyl groups, in an amount of from 0.2 to 3.0 moles per mole of said epoxy compound (A), or (2) a product of a melt reaction of said epoxy compound (A) with said organic compound (B) at a compound (B)/compound (A) mole ratio of from 0.5 to 2.0 at a temperature of from 100° to 200° C. for a period of from 5 to 30 minutes, in such an amount that said epoxy compound (A) prior to said melt reaction is in an amount of from 0.0005 to 0.02 moles per 100 g of said polyester, and then melt mixing and milling the blend.

2. A polyester composition according to claim 1, wherein said carboxyl group-containing organic compound is selected from the group consisting of acrylic acid, methacrylic acid, maleic acid, itaconic acid and the anhydrides thereof.

3. A polyester composition according to claim 1, wherein said carboxyl group-containing organic compound is selected from the group consisting of trimellitic acid, phthalic acid, terephthalic acid, benzoic acid, methylbenzoic acid, dimethylbenzoic acid and the anhydrides thereof.

4. A polyester composition according to claim 1, wherein said amino group-containing organic compound is selected from the group consisting of ethylenediamine, tetramethylenediamine, hexamethylenediamine, diphenylamine and γ-aminopropyl-trimethoxysilane.

5. A polyester composition according to claim 1, wherein said isocyanate group-containing organic compound is selected from the group consisting of hexamethylene diisocyanate, 4,4'-diphenylmethane diisocyanate, 2,6-tolylene diisocyanate and m-phenylene diisocyanate.

6. A polyester composition according to claim 1, wherein said hydroxyl group-containing organic compound is selected from the group consisting of glycerol, ethylene glycol, propylene glycol, sorbitol, resorcinol and 2-hydroxyethyl acrylate.

7. A polyester composition according to claim 1, wherein said melt mixing and milling are carried out at a temperature of from 265° to 300° C. for a period of from 2 to 10 minutes.

8. A polyester composition according to claim 1, wherein said composition comprises from 10 to 50% by weight of a fibrous filler based on the total weight of the composition.

9. A polyester composition according to claim 8 wherein said fibrous filler is selected from the group consisting of glass fibers, asbestos fibers, titanate fibers and carbon fibers.

10. A polyester composition according to claim 8, wherein said composition comprises from 1 to 40% by weight of glass flakes based on the total weight of the composition.

11. A polyester composition according to claim 10, wherein said glass flakes are each of a size not larger than 32 mesh and of a thickness of from 0.5 to $10\mu$.

12. A polyester composition obtained by blending, with polyester comprising at least 80% by mole of ethylene terephthalate units, a product of a melt reaction of an epoxy compound (A) selected from the group consisting of triglycidyl isocyanurate, N-methyl, N',N''-diglycidyl isocyanurate and triglycidyl cyanurate with an aromatic compound (B) capable of reacting with the epoxy group of said epoxy compound (A) and having one or more carboxyl groups at a compound (B)/compound (A) mole ratio of from 0.5 to 2.0 at a temperature of from 100° to 200° C. for a period of from 5 to 30 minutes, in such an amount that said epoxy compound (A) prior to the melt reaction is in an amount of from 0.0005 to 0.02 moles per 100 g of said polyester, and glass fibers in an amount of from 10 to 50% by weight and glass flakes in an amount of 1 to 40% by weight, based on the total weight of the composition, and then, melt mixing and milling the blend.

* * * * *